United States Patent
Chen et al.

(10) Patent No.: US 10,779,609 B2
(45) Date of Patent: Sep. 22, 2020

(54) APPAREL AND SPORTING EQUIPMENT WITH AN UV RADIATION CURABLE MATERIAL AND METHOD OF MANUFACTURING THEREOF

(71) Applicant: NIKE, Inc., Beaverton, OR (US)

(72) Inventors: Yuchung K. Chen, Portland, OR (US); Jay Constantinou, Beaverton, OR (US); Oliver McLachlan, Beaverton, OR (US); Thomas J. Rushbrook, Portland, OR (US)

(73) Assignee: NIKE, INC., Beaverton, OR (US)

( * ) Notice: Subject to any disclaimer, the term of this patent is extended or adjusted under 35 U.S.C. 154(b) by 32 days.

(21) Appl. No.: 15/959,550

(22) Filed: Apr. 23, 2018

(65) Prior Publication Data

US 2018/0303196 A1  Oct. 25, 2018

Related U.S. Application Data

(60) Provisional application No. 62/488,978, filed on Apr. 24, 2017.

(51) Int. Cl.
*A43B 13/04* (2006.01)
*A43B 1/14* (2006.01)
(Continued)

(52) U.S. Cl.
CPC .............. *A43B 13/04* (2013.01); *A43B 1/14* (2013.01); *A43B 13/14* (2013.01); *A43B 13/223* (2013.01);
(Continued)

(58) Field of Classification Search
CPC ....... A43B 1/14; A43B 13/04; A43B 23/0255; B29D 35/122; B29D 35/126
See application file for complete search history.

(56) References Cited

U.S. PATENT DOCUMENTS 2,684,305 A    7/1954  Leroy
3,250,840 A *  5/1966  Procopio .............. C08G 18/10
                                                   264/175
(Continued)

FOREIGN PATENT DOCUMENTS

CN    1085756 A    4/1994
CN  102529287 A    7/2012
(Continued)

OTHER PUBLICATIONS

International Search Report for PCT/US2018/028812 dated Jul. 10, 2018.
(Continued)

*Primary Examiner* — Ted Kavanaugh
(74) *Attorney, Agent, or Firm* — Thomas | Horstemeyer, LLP

(57) ABSTRACT

An article of apparel or sporting equipment, such as garments and footwear incorporates a molded component formed of a UV radiation curable material. In the case of an article of footwear, the UV radiation curable material may be formed into an outsole. The method of manufacturing such articles include placing an ultraviolet radiation curable material in contact with a molding surface; conforming the UV radiation curable material to a shape of the molding surface, forming a molded component; and removing the molded component from the molding surface, such that the component maintains the shape of the molding surface. The molded component may be exposed to ultraviolet radiation in an amount and for a duration that is sufficient to partially cure or fully cure the UV radiation curable material.

16 Claims, 5 Drawing Sheets

(51) Int. Cl.
*A43B 13/14* (2006.01)
*A43B 23/02* (2006.01)
*A43B 13/22* (2006.01)
*B29D 35/06* (2010.01)
*B29D 35/12* (2010.01)
*B29D 35/08* (2010.01)
*B29D 35/00* (2010.01)
*B29K 675/00* (2006.01)
*A43B 13/12* (2006.01)
*B29K 75/00* (2006.01)
*B29K 667/00* (2006.01)

(52) U.S. Cl.
CPC ........ *A43B 23/025* (2013.01); *B29D 35/0054* (2013.01); *B29D 35/065* (2013.01); *B29D 35/085* (2013.01); *B29D 35/122* (2013.01); *B29D 35/124* (2013.01); *B29D 35/126* (2013.01); *A43B 13/122* (2013.01); *A43B 23/0255* (2013.01); *B29K 2075/00* (2013.01); *B29K 2667/003* (2013.01); *B29K 2675/00* (2013.01)

(56) References Cited

U.S. PATENT DOCUMENTS

| | | | | |
|---|---|---|---|---|
| 5,632,057 | A | * | 5/1997 | Lyden ................ A43B 3/0063 12/146 B |
| 2004/0143034 | A1 | | 7/2004 | Primke et al. |
| 2012/0021151 | A1 | | 1/2012 | Tatarka et al. |
| 2014/0020192 | A1 | | 1/2014 | Jones et al. |
| 2016/0021969 | A1 | * | 1/2016 | Lettow, II ................ A43B 1/14 36/87 |
| 2016/0362552 | A1 | * | 12/2016 | Reichel ................ B29C 48/022 |

FOREIGN PATENT DOCUMENTS

| | | | |
|---|---|---|---|
| CN | 103561929 | A | 2/2014 |
| CN | 104859277 | A | 8/2015 |
| CN | 106418874 | A | 2/2017 |
| DE | 19753863 | A1 | 6/1998 |
| EP | 137888 | A2 | 4/1985 |
| EP | 1378898 | A1 | 1/2004 |
| EP | 1434211 | A1 | 6/2004 |
| EP | 1484148 | A1 | 12/2004 |
| EP | 1872924 | A1 | 1/2008 |
| EP | 2441338 | A2 | 4/2012 |
| EP | 2671703 | A2 | 12/2013 |
| EP | 2838708 | A2 | 2/2015 |
| EP | 3053732 | A1 | 8/2016 |
| JP | H0345902 | A | 2/1991 |
| WO | 2007066652 | A1 | 6/2007 |
| WO | 201217008 | A1 | 12/2012 |
| WO | 2014015033 | A2 | 1/2014 |
| WO | 2016089462 | A1 | 6/2016 |
| WO | 2017007533 | A1 | 1/2017 |

OTHER PUBLICATIONS

International Search Report for PCT/US2018/028815 dated Jul. 24, 2018.
International Search Report for PCT/US2018/028817 dated Jul. 24, 2018.
International Search Report for PCT/US2018/028814 dated Sep. 6, 2018.
International Preliminary Report on Patentability for PCT/US2018/028815 dated Jul. 8, 2019.
Written Opinion of the International Preliminary Examining Authority for PCT/US2018/028815 dated Apr. 23, 2019.
International Preliminary Report on Patentability for PCT/US2018/028817 dated May 8, 2019.
International Preliminary Report on Patentability for PCT/US2018/028812 dated Aug. 7, 2019.
International Preliminary Report on Patentability for PCT/US2018/028814 dated May 8, 2019.

* cited by examiner

APPAREL AND SPORTING EQUIPMENT WITH AN UV RADIATION CURABLE MATERIAL AND METHOD OF MANUFACTURING THEREOF

CROSS-REFERENCE TO RELATED APPLICATIONS

This application claims priority to U.S. Provisional Application No. 62/488,978 filed Apr. 24, 2017, the entire content of which is incorporated herein by reference.

FIELD

This disclosure relates generally to articles of apparel or sporting equipment, such as garments and footwear that comprise a component formed from an ultraviolet (UV) radiation curable material.

BACKGROUND

The statements in this section merely provide background information related to the present disclosure and may not constitute prior art.

Conventional articles of footwear normally include both an upper and sole structure. The upper generally forms an interior void that securely and comfortably receives a foot. The sole structure may be secured to the upper and is generally positioned between the foot and the ground. This sole structure may attenuate ground reaction forces, provide traction, as well as limit potentially harmful foot motion. Accordingly, the upper and sole structure operate together to provide a comfortable structure that is well suited for use in a wide variety of activities.

The sole structure may comprise multiple layers that are conventionally referred to as an insole, a midsole, and an outsole. The insole is a thin, compressible member located within the void of the upper and adjacent to the midsole and the foot in order to enhance comfort. The midsole may be secured to the upper and forms a middle layer in the sole structure that attenuates the ground reaction forces. The outsole forms the element of the sole structure that makes contact with the ground and is usually fashioned from a durable and wear-resistant elastomeric material that may include a tread pattern to impart traction.

Despite the various models and characteristics available with conventional footwear, new footwear models and constructions are continually desired to provide further development and advancement in the art.

DRAWINGS

In order that the disclosure may be well understood, there will now be described various forms thereof, given by way of example, reference being made to the accompanying drawings, in which.

Figure 1A:
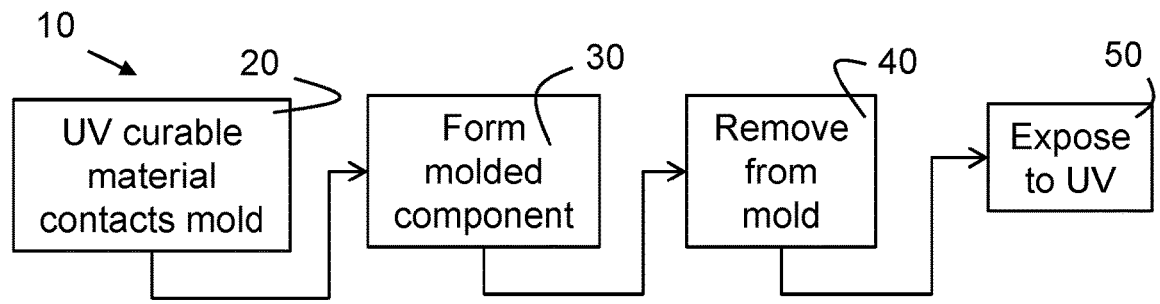
FIG. 1A is a flow chart of a method of manufacturing a component of an article of apparel or sporting equipment according to the teachings of the present disclosure.

The drawings described herein are for illustration purposes only and are not intended to limit the scope of the present disclosure in any way.

DETAILED DESCRIPTION

The present disclosure generally provides a method of forming an article of apparel or sporting equipment, such as a garment or footwear, as well as the article that is formed. Ultraviolet (UV) radiation curable materials can be used to form a durable portion of an article of apparel or sporting equipment, such as a portion of an interior or exterior surface of the article. For example, shaped portions of UV radiation curable elastomers can be molded or shaped using relatively low temperatures and pressures, and optionally cured, without exposing the textile to the high temperatures and pressures which would be required to shape and cure conventional rubber in a vulcanization process.

The method includes placing an UV radiation curable material in contact with a molding surface; using heat or pressure or both to conform the UV radiation curable material to a shape of the molding surface, thereby, forming a molded component; and removing the molded component from the molding surface, such that the component maintains the shape of the molding surface. Optionally, the method may further comprise forming the UV radiation curable material into a sheet prior to having the material conform to the shape of the molding surface, cutting or trimming the UV radiation curable material before the conforming step and/or from the molded component.

The molded component may be exposed to ultraviolet radiation in an amount and for a duration that is sufficient to at least partially cure the UV radiation curable material. In some examples, the molded component may be exposed to UV radiation in an amount and for a duration that is sufficient to fully cure the UV radiation curable material. The UV radiation curable material may comprise an UV radiation curable elastomer, one or more photoinitiators, and optionally, one or more processing aids.

According to another aspect of the present disclosure, a method of forming an article of footwear is provided. This method comprises receiving an upper; receiving a component of an article formed according to the molding process previously described above and further defined herein; and attaching the upper to the component. In other words, the method comprises attaching an upper to a component, wherein the component is an article formed according to the molding process previously described above and as further defined herein. The component may be an outsole formed from a UV radiation curable material. The method may further comprise attaching a midsole or midsole component to the outsole before or concurrently with attaching the upper to the outsole. The step of attaching the outsole to either the midsole or the upper may include exposing the outsole to the UV radiation in an amount and for a duration that is sufficient to either partially cure or fully cure the UV radiation curable material. When desirable, other means of attaching the upper and the component, or of enhancing the bond strength between the upper and the component may be used, such as using an adhesive or primer, as well as providing a surface texture to the outsole, midsole, or upper prior to the attaching.

The method may further comprise providing a pattern, such as a tread pattern, to at least one surface of the outsole. Other traction elements may also be attached to the outsole. When desirable, a cooling step may be included as part of the method after the application of a compressive force (e.g., pressure or vacuum) and optional heat, and prior to removing the outsole from the mold.

According to another aspect of the present disclosure, an article of footwear is provided. The article of footwear comprises an upper and an outsole having a shape, such as a predetermined shape. The outsole comprises the UV radiation curable material in an uncured or partially cured state. The outsole is attached to the upper. Optionally, the article of footwear may also comprise a midsole or a midsole component attached to the outsole. The outsole may include at least one surface with a tread pattern, where the tread pattern is present in a portion of the outsole comprising the UV radiation curable material, where the UV radiation curable material is in an uncured, partially cured, or fully cured state. When desirable, an adhesive or primer applied to the outsole, midsole, and/or upper may be used to form the bond or attachment between the components, or to enhance the strength of the bond or attachment between the components. In some examples, the attachment between the components is maintained after exposure up to a force of 2.5 kgf/cm measured according to a Bond Strength Testing Protocol as described below.

According to yet another aspect of the present disclosure, a method of finishing an article of footwear having an upper, an outsole, and optionally, a midsole comprising an article of footwear with an outsole formed from an uncured or partially cured UV radiation curable material is provided. This method comprises providing the article of footwear and exposing the outsole to ultraviolet (UV) radiation, such that the UV radiation curable portion of the outsole is fully cured.

Further areas of applicability will become apparent from the description provided herein. It should be understood that the description and specific examples are intended for purposes of illustration only and are not intended to limit the scope of the present disclosure.

The following description is merely exemplary in nature and is in no way intended to limit the present disclosure or its application or uses. For example, the molded component comprising an ultraviolet (UV) curable material made and used according to the teachings contained herein is described throughout the present disclosure in conjunction with footwear in order to more fully illustrate the composition and the use thereof. The incorporation and use of such a molded UV radiation curable component in other applications, including apparel such as garments, sporting equipment, or the like are contemplated to be within the scope of the present disclosure. It should be understood that throughout the description, corresponding reference numerals indicate like or corresponding parts and features.

The present disclosure generally provides a method of forming a component of an article of apparel or sporting equipment. Referring to FIG. 1A, this method 10 comprises placing an ultraviolet (UV) radiation curable material in contact with a molding surface 20, conforming the UV radiation curable material to the shape of the molding surface, thereby, forming a molded component 30, and removing the molded component from the molding surface 40. When desirable, the use of heat and/or pressure applied to the UV radiation curable material may assist the material to conform to the shape of the molding surface. The molded component that is removed from the molding surface 40 is able to maintain the shape of the molding surface.

Figure 1B:
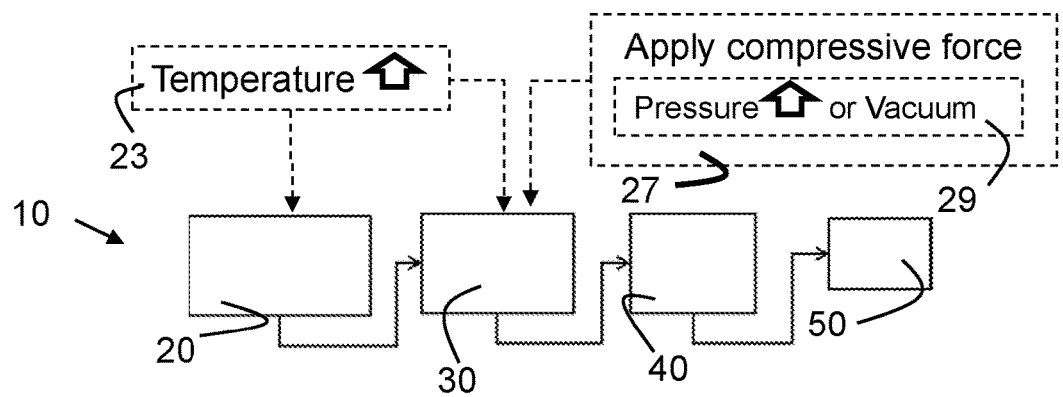
FIG. 1B is a flow chart of optional steps associated with the method of FIG. 1A.

Referring now to FIG. 1B, when temperature is applied to at least a portion of the UV radiation curable material, the temperature may be increased before the placing of the material in contact with the molding surface, as well as prior to or during conforming the material to the shape of the molding surface 23. The heat applied to the UV radiation curable material is generally maintained between about ambient or room temperature and less than 170° C. Alternatively, the temperature may range between about 40° C. and about 165° C. The UV radiation curable material softens with this predetermined temperature range, such that the UV radiation curable material can be contoured or shaped as desired to conform to the shape of the molding surface. The temperature of the UV radiation curable material is generally reduced to a point wherein the material is no longer softened prior to the exposing the UV radiation curable material to ultraviolet (UV) radiation.

Still referring to FIG. 1B, a compressive force may be applied to the molding surface or to the UV radiation curable material during the conforming of the material to the shape of the molding surface 27. This compressive force may be applied by increasing pressure or applying a vacuum 29. A cooling step may be optionally used after the application of the compressive force and prior to removing the molded component from the mold. The pressure that is applied to the UV radiation curable material is generally between about 2 kgf/cm$^2$ (~28 psi) to about 200 kgf/cm$^2$ (~2,800 psi). Alternatively, the amount of pressure applied ranges from about 3 kfg/cm$^2$ (~40 psi) to about 6 kfg/cm$^2$ (~80 psi); alternatively, between about 6 kfg/cm$^2$ (~80 psi) to about 35 kfg/cm$^2$ (~500 psi); and alternatively, between about 35 kfg/cm$^2$ (~500 psi) to about 150 kfg/cm$^2$ (~2,100 psi).

For the purpose of this disclosure the terms "about" and "substantially" are used herein with respect to measurable values and ranges due to expected variations known to those skilled in the art (e.g., limitations and variability in measurements).

For the purpose of this disclosure any range in parameters that is stated herein as being "between [a 1$^{st}$ number] and [a 2$^{nd}$ number]" or "between [a 1$^{st}$ number] to [a 2$^{nd}$ number]" is intended to be inclusive of the recited numbers. In other words the ranges are meant to be interpreted similarly as to a range that is specified as being "from [a 1$^{st}$ number] to [a 2$^{nd}$ number]".

When desirable, various precautions or safeguards may be undertaken by one skilled in the art in order to protect at least a portion of the UV radiation curable material from being exposed to UV radiation during one or more steps of the method. Such precautions or safeguards may include, but not be limited to, masking a portion of the molding surface or maintaining the UV radiation curable material in an environment that is absent any UV/visible light.

The molding surface may be a single substantially planar surface or incorporated as part of a compression mold or a mold used in an injection molding process or another type of forming process, such as cast molding, thermoforming or vacuum forming. The molding surface may be entirely or at least partially smooth or textured. The texturing of the molding surface may be done in a manner that provides the surface of the molded component with a greater degree of roughness or the formation of irregularities that will enhance the ability to bond a surface of another material or component thereto. This bonding or adherence may be accomplished with or without the use of an adhesive or cement. The texturing of the molding surface may also be done in order to impart a visible design or pattern to the surface of the molded component.

Figure 1C:
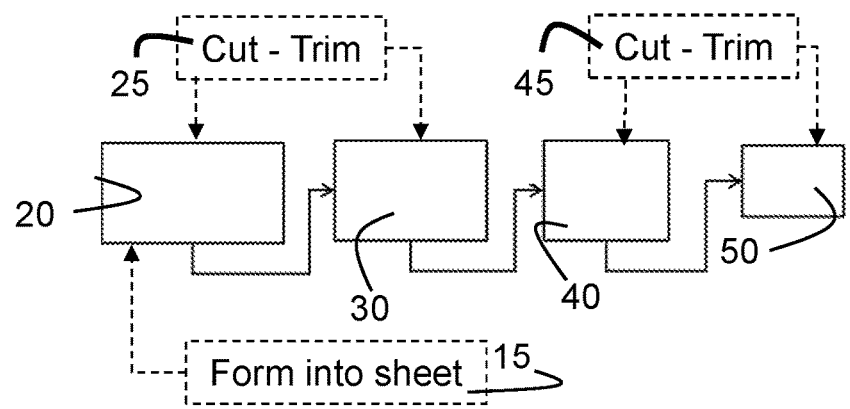
FIG. 1C is a flow chart of other optional steps associated with the method of FIG. 1A.

Referring now to FIG. 1C, the method 10 may further comprise forming the UV radiation curable material into a sheet 15 prior to placing the material in contact with the molding surface 20. The UV radiation curable material may also be subjected to cutting or trimming any excess material or unnecessary material prior to forming the material into a molded component 25. Additional UV material may be trimmed or cut from the molded component 45 as part of a finishing operation. Other finishing operations, which include but are not limited to, polishing embossing, steaming/ironing, brushing, or decorative stitching, to name a few can also be performed on the molded component without exceeding the scope of the present disclosure.

Referring once again to FIG. 1A, after the molded component is removed from the molding surface 40, the molded component may be exposed to ultraviolet (UV) radiation 50, in an amount and for duration in time that is sufficient to at least partially cure the UV radiation curable material. Alternatively, upon exposure to the UV radiation, the UV radiation curable material may be fully or substantially cured. For the purpose of this disclosure, the term "partially cured" is intended to denote the occurrence of at least about 1%, alternatively, at least about 5% of the total polymerization required to achieve a substantially full cure. The term "fully cured" is intended to mean a substantially full cure in which the degree of curing is such that the physical properties of the UV radiation curable material do not noticeably change upon further exposure to additional UV radiation.

When desirable, UV radiation curable material may alternatively be exposed to the UV radiation 50 when it is still in contact with the molding surface 30, i.e., prior to being removed from the molding surface 40. In this case, the cutting or trimming of the molded component 45 may be performed after exposure to the UV radiation.

The UV radiation curable material generally comprises one or more photopolymers or light-activated resins that will undergo a cross-linking reaction upon exposure to ultraviolet (UV) radiation. The UV radiation curable material may comprise a mixture of various multifunctional monomers, oligomers, and/or low molecular weight polymers or copolymers, along with one or more photoinitiator(s) that can undergo polymerization in the presence of UV radiation. Upon exposure to UV radiation, the photoinitiator decomposes into a reactive species that activates polymerization of specific functional groups that are present in the multifunctional oligomers, monomers, or polymers.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polyurethane is interpreted to include one or more polymer molecules of the polyurethane, where the polymer molecules may or may not be identical (e.g., different molecular weights).

The end result of curing a light-activated resin in this manner is the formation of a thermoset or cross-linked polymer network. Thus the UV radiation curable material may be described as being an UV radiation curable elastomer. Alternatively, the UV radiation curable material may comprise an UV radiation curable rubber. The UV radiation curable material may comprise one or more thermoset polymers, thermoplastic polymers, or combinations thereof. When desirable, the one or more thermoplastic polymers may be one or more thermoplastic polyurethanes (TPU).

Several specific examples of various monomers that may be used in the UV radiation curable material include, but are not limited to, styrene and styrenic compounds, vinyl ethers, N-vinyl carbazoles, lactones, lactams, cyclic ethers, cyclic acetals, and cyclic siloxanes. Several specific examples of oligomers and low molecular weight polymers or copolymers that may be incorporated into the UV radiation curable material include, without limitation, epoxides, urethanes, polyethers, or polyesters, each of which provide specific properties to the resulting material. Each of these oligomers or polymers may be functionalized using an acrylate. Alternatively, the UV radiation curable material may include a mixture of urethane and acrylate oligomers or a copolymer thereof.

Photoinitiation may occur via a free radical mechanism, an ionic mechanism, or a combination thereof. Under an ionic mechanism, the polymerizable oligomers, monomers, or polymers are doped with either anionic or cationic photoinitiators. Several examples of such photoinitiators, include without limitation, onium salts, organometallic compounds, and pyridinium salts. In the free radical mechanism, the photoinitiators generate free-radicals by the abstraction of a hydrogen atom from a donor or co-initiator compound (i.e., a 2-component system), or by the cleavage of a molecule (i.e., a 1-component system). Several specific examples of abstraction type photoinitiators, include but are not limited to, benzophenone, xanthones, and quinones with common donor compounds being aliphatic amines. Several specific examples of cleavage-type photoinitiators include, without limitation, benzoin ethers, acetophenones, benzoyl oximes, and acylphosphines. Photocurable materials that form through the free-radical mechanism undergo chain-growth polymerization, which includes three basic steps: initiation, chain propagation, and chain termination. Alternatively, the photoinitiators are independently selected and may include phosphine oxides, benzophenones, a-hydroxyalkyl aryl ketones, thioxanthones, anthraquinones, acetophenones, benzoins and benzoin ethers, ketals, imidazoles, phenylglyoxylic acids, peroxides, and sulfur-containing compounds.

The amount of photoinitiators present in the UV radiation curable material is determined by the effective amount necessary to induce crosslinking of the UV radiation curable material. This amount may range from about 0.05 weight percent (wt. %) to about 5 wt. %, alternatively, from about 0.1 wt. % to about 2 wt. %, and alternatively, from about 0.2 wt. % to about 1 wt. % based on the weight of the UV radiation curable material. A single type of photoinitiator or a mixture of different photoinitiators may be used.

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

According to one aspect of the present disclosure, the UV radiation curable material may comprise, consist of, or consist essentially of a millable polyurethane gum that includes ethylenic unsaturation, one or more photoinitiators, and at least one additional crosslinking additive that comprise two or more ethylenically unsaturated groups. The millable polyurethanes may be prepared by the reaction of a di- or polyisocyanate with bis(hydroxyl)-functional compounds, at least one of which contains ethylenic unsaturation. Alternatively, unsaturated polyester polyols may be used, alone or in combination with other isocyanate-reactive components, such as polyoxyalkylene glycols and/or diols capable of providing pendent ethylenic unsaturation. A commercial example of such a UV radiation curable material is Millathane® UV (TSE Industries Inc., Clearwater, Fla.). Further description of such a UV radiation curable material is provided in U.S. Publication No. 2016/0362552, the entire content of which is hereby incorporated by reference.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

The additional crosslinking additive present in the curable polyurethane composition may include any low molecular weight compounds that contain two or more ethylenically unsaturated groups. These unsaturated groups may include, without limitation, glycerol diallyl ether, 1,6-hexanediol di(meth)acrylate, triallylisocyanurate, trimethylolpropane di(meth)acrylate, trimethylolpropane tri(meth)acrylate, glycerol di(meth)acrylate, glycerol tri(meth)acrylate, propoxylated glycerol triacrylate, 1,2-divinyltetramethyldisiloxane, divinylbenzene, and the like. The molecular weight of this additional crosslinking additive may be less than about 2000 Da, alternatively less than about 1000 Da, alternatively less than about 500 Da. The concentration of the crosslinking additive in the UV radiation curable material is selected based upon the amount of ethylenic unsaturated groups that are desired. The concentration of this additive may range from about 0.01 wt. % to about 15 wt. %, alternatively, from about 1 wt. % to about 12 wt. %, and alternatively, from about 5 wt. % to about 10 wt. % based on the overall weight of the UV radiation curable material.

When desirable, the UV radiation curable material may optionally comprise one or more additional processing aids, including without limitation, plasticizers, mold release agents, lubricants, antioxidants, flame retardants, dyes, pigments, reinforcing and non-reinforcing fillers, fiber reinforcements, and light stabilizers or UV absorbers. When an UV absorber is incorporated into the UV radiation curable material in order to enhance the environmental stability thereof, it may be necessary or desirable to use a more powerful UV light source to achieve full cure of the material, or use an UV light source having an output wavelength that is in a range within the UV spectrum at which the UV absorber exhibits a reduced level of absorbance.

The reinforcing fillers that may optionally be incorporated into the UV radiation curable material may be organic, i.e. polymeric, or inorganic in nature. These fillers may exhibit a mean, weight average particle sizes that is 1 μm, alternatively, in the range between about 20 nanometers (nm) to about 500 nm. Several specific examples of reinforcing fillers include, but are not limited to, pyrogenic (i.e., fumed) metal oxides, such as alumina, titania, ceria, silica, and the like; colloidal metal oxides, such as colloidal alumina or silica; carbon black and acetylene black; metal hydroxides, such as aluminum hydroxide; glass or polymer microspheres; or limestone, talc, clay, and the like. The amount of filler present in the UV radiation curable material is selected based upon the requirements associated with a particular end use. Typically, the amount of reinforcing filler present in the UV radiation curable material ranges from 0 wt. % to about 20 wt. % based on the total weight of the UV radiation curable material. Fillers having the same chemical composition may be considered to be non-reinforcing fillers when their mean, weight average particle size is greater than 1 μm, alternatively, in the range of about 2 mm to about 500 mm.

The UV radiation curable material may be cured by irradiation with UV light transmitting a wavelength that is the same as the excitation wavelength exhibited by the photoinitiator present. The UV light may be produced from any known source, including without limitation, low, medium, or high pressure mercury vapor lamps, xenon lamps, quartz halogen lamps, or lasers operating in the short wavelength portion of the spectra, e.g., in the range of about 180 nm to about 400 nm. Several more specific examples of UV light sources include, but are not limited to, short-wave UV lamps, gas-discharge lamps, ultraviolet LEDs, UV lasers, tunable vacuum ultraviolet (VUV) obtained from sum and difference frequency mixing, or plasma and synchrotron sources of extreme UV radiation.

The duration in time that the UV radiation curable material is irradiated with UV radiation is variable and based upon the nature and type of reactive oligomers, monomers, or polymers present in the UV radiation curable material, as well as type and concentration of the crosslinking additives, photoinitiators, and fillers, as well as the type and power associated with the available UV light source. The duration of UV exposure may range less than a second to several hours; alternatively, the exposure time is between about 1 second and about 1 hour; alternatively, between about 5 seconds and 5 minutes. The UV radiation curable material may be irradiated at ambient or room temperature within the confines of a molding operation or at a temperature associated with the component formed in a molding or extrusion process. When desirable the molded part may be subjected to a cooling step prior to irradiation with UV light. Although, no thermal cure is necessary, a dual cure system may be used when desirable.

According to another aspect of the present disclosure, the component of the article of apparel or sporting equipment may be a garment or an article of footwear, such as for example, an outsole. As used herein, the terms "article of footwear" and "footwear" are intended to be used interchangeably to refer to the same article. Typically, the term "article of footwear" will be used in a first instance, and the term "footwear" may be subsequently used to refer to the same article for ease of readability.

The article of footwear, apparel, or sporting equipment of the present disclosure may be designed for a variety of uses, such as sporting, athletic, military, work-related, recreational, or casual use. The article may be used outdoors on paved or unpaved surfaces (in part or in whole), such as on a ground surface including one or more of grass, turf, gravel, sand, dirt, clay, mud, and the like, intended for the performance of an athletic competition or as a general outdoor surface. The article may also be desirably used with indoor activities, such as indoor sports, shopping, and everyday work.

Figures 2A, 2B:
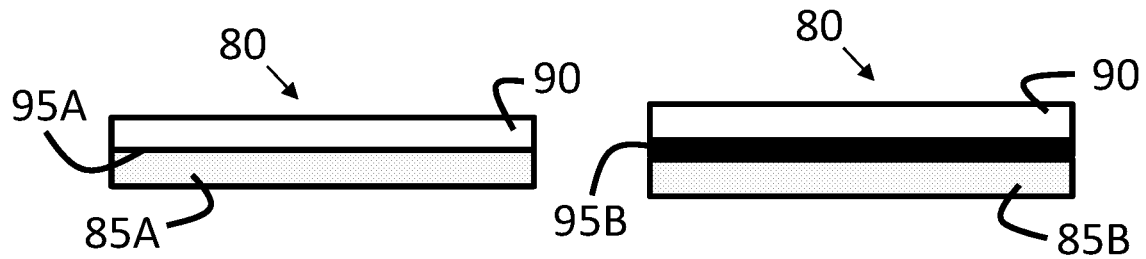
FIG. 2A is a cross-sectional schematic view of an article of apparel or sporting equipment formed according to the teachings of the present disclosure.
FIG. 2B is a schematic view of an article of apparel or sporting equipment formed according to the teachings of the present disclosure.

Referring now to FIG. 2A, the article of apparel or sporting equipment 80 may comprise a first molded component 85A that includes an ultraviolet (UV) radiation cured material; and a second component 90. The first and second components 85A, 90 are attached to each other and form the article of apparel or sporting equipment 80. The first and second components 85A, 90 may be attached to each other at least by a bond at the interface 95 formed directly between the UV radiation cured material of the first component 85A and the second component 90. The interface 95 between the UV radiation cured material of the first component 85A and the second component 90 is free of adhesive materials.

According to another aspect of the present disclosure, the article of apparel, or sporting equipment 80 as shown in FIG. 2B may comprise a first component 85B having a predetermined shape that includes an UV radiation curable material in an uncured or partially cured state, and a second component 90. The first and second components 85B, 90 are attached to each other and form the article of apparel or sporting equipment 80. An adhesive or primer layer 95B may be located on a surface of the first component 85B or second component 90 that assists in attaching the two components 85B, 90 together.

Figure 2C:
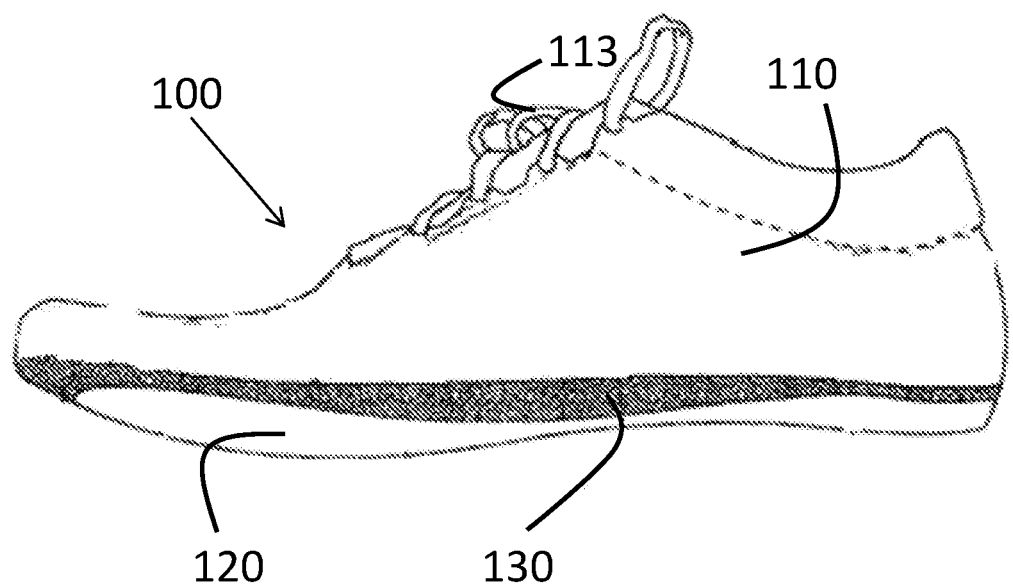
FIG. 2C is a perspective schematic view of an article of footwear formed according to the teachings of the present disclosure.
Figure 2D:
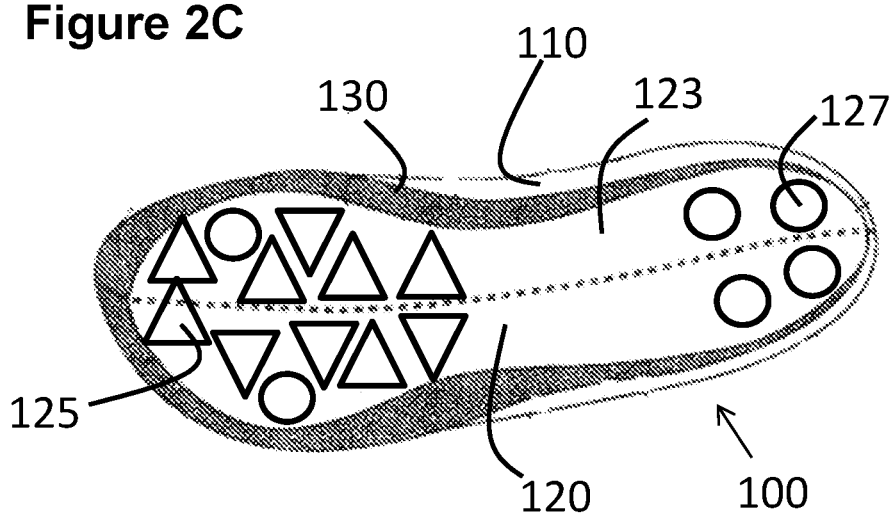
FIG. 2D is a schematic view of the bottom of the article of footwear of FIG. 2C.

Referring now to FIGS. 2C and 2D, when the article of apparel is footwear 100 or a shoe 100, the article may comprise, consist of, or consist essentially of an upper 110 and an outsole 120 having a predetermined shape. The outsole 120 is attached to the upper 110. At least part of the outsole 120 comprises the UV radiation curable material as described above and further defined herein in a cured state, an uncured state, or partially cured state. When desired, a midsole 130 or a midsole component 130 may be present, which is attached to the outsole 120.

Referring now to FIG. 2B, the outsole 120 refers to the very bottom of the shoe that is in direct contact with the ground. The outsole 120 may be relatively smooth 123 or include a tread pattern 125. The outsole may also optionally include a plurality of other traction elements 127 that provide support or flexibility to the outsole 120 and/or are included for other aesthetic design purposes. The traction elements 127 may include, but are not limited to cleats, studs, spikes, or similar elements configured to enhance traction for a wearer during cutting, turning, stopping, accelerating, and backward movement.

Since the outsole 120 is the outer most sole of the shoe, it is directly exposed to abrasion and wear. Various portions of the outsole 120 may be constructed with different thickness and exhibit different degrees of flexibility. The materials that comprise the outsole 120 should provide some degree of waterproofing, durability, and possess a coefficient of friction that is high enough to prevent slipping. In some cases two or more materials of different densities can be incorporated into the outsole 120 to give a hard wearing outer surface and a softer, more flexible midsole 130 for greater comfort. The outsole 120 may be a single layer or may contain multiple layers of the same or similar material.

The outsole 120 may be directly or otherwise operably secured to the upper 110 using any suitable mechanism or method. As used herein, the terms "operably secured to", such as for an outsole that is operably secured to an upper, refers collectively to direct connections, indirect connections, integral formations, and combinations thereof. For instance, for an outsole that is operably secured to an upper, the outsole can be directly connected to the upper (e.g., glued with cement or an adhesive), the outsole can be indirectly connected to the upper (e.g., with an intermediate midsole), can be integrally formed with the upper (e.g., as a unitary component), and combinations thereof. When a midsole is present, the upper 110 may be stitched, glued, or otherwise attached to the midsole at any suitable location.

Still referring to FIGS. 2C and 2D, the upper 110 of the footwear 100 has a body which may be fabricated from materials known in the art for making articles of footwear, and is configured to receive a user's foot. The upper 110 of a shoe consists of all components of the shoe above the outsole 120 and midsole 130 when present. The different components of the upper 110 may include a toe box, heal counter, and an Achilles notch, to name a few. These components are attached by stitches or molded and fused to become a single unit to which the outsole and the midsole are attached.

The upper 110 or components of the upper 110 usually comprise a soft body made up of one or more lightweight materials. The materials used in the upper 110 provide stability, comfort, and a secure fit. For example, the upper may be made from or include one or more components made from one or more of natural or synthetic leather, a textile or both. The textile may include; a knit, braided, woven, or nonwoven textile made in whole or in part of a natural fiber; a knit, braided, woven or non-woven textile made in whole or in part of a synthetic polymer, a film of a synthetic polymer, etc.; and combinations thereof. The textile may include one or more natural or synthetic fibers or yarns. The synthetic yarns may comprise, consist of, or consist essentially of thermoplastic polyurethane (TPU), polyamide (e.g., Nylon®, etc.), polyester (e.g., polyethylene terephthalate, PET), polyolefin, or a mixture thereof.

The upper 110 and components of the upper 110 may be manufactured according to conventional techniques (e.g., molding, extrusion, thermoforming, stitching, weaving, knitting, etc.). While illustrated in FIG. 2A as a generic design, the upper 110 may alternatively have any desired aesthetic design, functional design, brand designators, or the like.

Still referring to FIG. 2C, the upper 110 may further comprise laces 113 or other securing or foot engagement structures (e.g., strap, etc.) may be provided to securely hold the shoe 100 to a wearer's foot. A tongue member, bootie, or other similar type structure may be provided in or near the shoe instep area in order to increase comfort and/or to moderate the pressure or feel applied to the wearer's foot by the laces 113.

When desirable, at least a portion of the upper 110 of the article of footwear, and in some embodiments substantially the entirety of the upper, may be formed of a knitted component. The knitted component may additionally or alternatively form a component of the upper or another element of the article of footwear 110 such as the midsole 130, for example. The knitted component may have a first side forming an inner surface of the upper 110 (e.g., facing the void of the article of footwear 100) and a second side forming an outer surface of the upper 110. An upper 110 including the knitted component may substantially surround the void so as to substantially encompass the foot of a person when the article of footwear is in use. The first side and the second side of the knitted component may exhibit different characteristics (e.g., the first side may provide abrasion resistance and comfort while the second side may be relatively rigid and provide water resistance). The knitted component may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the knitted component without the need for significant post-knitting processes or steps. Alternatively, two or more portions of the knitted component may be formed separately and then attached. In some embodiments, the knitted component may be shaped after the knitting process to form and retain the desired shape of the upper (for example, by using a foot-shaped last). The shaping process may include attaching the knitted component to another object (e.g., a strobel) and/or attaching one portion of the knitted component to another portion of the knitted component at a seam by sewing, by using an adhesive, or by another suitable attachment process.

Forming the upper 110 with the knitted component may provide the upper 110 with advantageous characteristics including, but not limited to, a particular degree of elasticity (for example, as expressed in terms of Young's modulus), breathability, bendability, strength, moisture absorption, weight, and abrasion resistance. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof.

The knitted component may also provide desirable aesthetic characteristics by incorporating yarns having different colors or other visual properties arranged in a particular pattern. The yarns and/or the knit structure of the knitted component may be varied at different locations such that the knitted component has two or more portions with different properties (e.g., a portion forming the throat area of the upper may be relatively elastic while another portion may be relatively inelastic). In some embodiments, the knitted component may incorporate one or more materials with properties that change in response to a stimulus (e.g., temperature, moisture, electrical current, magnetic field, or light). For example, the knitted component may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. The thermoplastic polymer material may provide the ability to heat and then cool a portion of the knitted component to thereby form an area of bonded or continuous material that exhibits certain advantageous properties including a relatively high degree of rigidity, strength, and water resistance, for example.

In some embodiments, the knitted component may include one or more yarns or strands that are at least partially inlaid or otherwise inserted within the knit structure of the knitted component during or after the knitting process, herein referred to as "tensile strands." The tensile strands may be substantially inelastic so as to have a substantially fixed length. The tensile strands may extend through a plurality of courses of the knitted component or through a passage within the knitted component and may limit the stretch of the knitted component in at least one direction. For example, the tensile strands may extend approximately from a biteline of the upper to a throat area of the upper to limit the stretch of the upper in the lateral direction. The tensile strands may form one or more lace apertures for receiving a lace and/or may extend around at least a portion of a lace aperture formed in the knit structure of the knitted component.

Still referring to FIGS. 2C and 2D, the midsole 130, when present as part of the shoe 100, provides additional stability and disperses the pressure applied by the foot to the ground. In other words, a midsole 130 can be used to cushion, as well as provide support and protection for the foot. Midsoles 130 are often constructed of a combination of materials. A dual density midsole 130 is one in which the midsole 130 is constructed of a combination of two materials that have different densities. The denser material is usually located where the foot would normally tend to roll. Midsoles 130 may be formed in a molding operation or cut and formed from sheet stock. The midsoles 130 may be formed as a single unit or from any desired number of independent pieces or parts without departing from the scope of the present disclosure.

Several specific examples of materials that may be used to form the midsole 130 of a shoe 100 include various types of polymeric foam materials. These polymeric foam materials include, without limitation, polyurethane (PU), ethylene vinyl acetate (EVA), phylon, Phylite®, and Lunar® foams. Phylite®, and Lunar® foams are trademarks of Nike Inc. (Beaverton, Oreg.).

Polyurethane (PU) foam, which is a dense, durable and stable midsole material, forms a firm midsole that provides protection from impact. Ethylene vinyl acetate (EVA) foam is soft, light, and flexible. EVA foam is an inexpensive midsole material because it can be cut and shaped from flat sheets of EVA foam. However, EVA foam also compresses faster than other midsole materials and may become flat over time as the air trapped within the foam is squeezed out. Once the EVA foam becomes compacted, it may not return to its original shape.

Phylon foam is a very lightweight, low-profile and responsive foam material. One example of Phylon foam is made of EVA foam pellets that are compressed, heat expanded and then cooled in a mold. Compression-molded phylon midsoles can be sculpted into a variety of designs. Phylon foam is easy to identify by the fine wrinkles the foam shows after usage.

Phylite® foam, which is a combination of 60% Phylon and 40% rubber can be used to form a midsole 130 through the use of various molding techniques, such as injection molding. Phylite® foam is lighter than rubber, but heavier than Phylon® foam and can function as a dual midsole material.

Lunar® foam is a hybrid of ethylene vinyl acetate (EVA) foam and nitrile rubber. It is 30% lighter than regular compression molded EVA foam or Phylon® foam. Instead of absorbing the impact when your heel strikes the floor it distributes the pressure along the foam to give a more even impact across the foot. Lunar® foam may be used in conjunction with or surrounded by either Phylon® foam or Phylite® foam as a carrier. When Lunar® foam is placed in a Phylon® carrier it may sometimes be referred to as Lunarlon® midsole. When the Lunar® Foam is placed in a Phylite® carrier it may sometimes be referred to as Lunarlite® midsole.

The midsole component 130 may be at least partially made from foam materials having a density that is less than about 0.25 g/cm$^3$; alternatively, less than about 0.2 g/cm$^3$; alternatively, within the range of about 0.075 to about 0.2 g/cm$^3$; and alternatively, within the range of about 0.1 to about 0.18 g/cm$^3$. Additional information concerning foam materials that may be used to form part of the midsole 130 may be found in U.S. Pat. No. 7,941,938, the entire contents of which are hereby incorporated by reference.

When desirable, the article of footwear 100 or shoe 100 may also include a platform upon which the foot will rest that separates the upper 110 from the soles (outsole 120 and midsole 130). This platform is typically a separate removable board called an insole (not shown) that is made of cellulose or other materials, such as thermoplastic or thermoset elastomers, capable of providing a cushion between the outsole 120 or midsole 130, when present, and the foot of the person wearing the shoe 100. The insole may be treated with additives to inhibit bacterial growth Referring once again to FIGS. 2C and 2D, the sole structure (outsole 120 with or without a midsole 130) of the shoe 100 may be engaged with or attached to the upper 110 in any desired manner, including manners that are conventionally known or used in the construction of footwear 100, such as through the use of cements or adhesives, by mechanical connectors, and by sewing or stitching, to name a few. In the illustrated example shown in FIGS. 2A and 2B, the sole structure includes both a midsole component 130 and an outsole component 120 engaged with or attached to the midsole component 130. This engagement may be accomplished in any desired manner, including manners that are conventionally known or used in the construction of footwear 100 (e.g., by cements or adhesives, by mechanical connectors, by sewing or stitching, etc.) as previously mentioned or by a bond formed directly between the upper 110 and outsole 120 via a UV radiation cure mechanism.

Figure 3A:
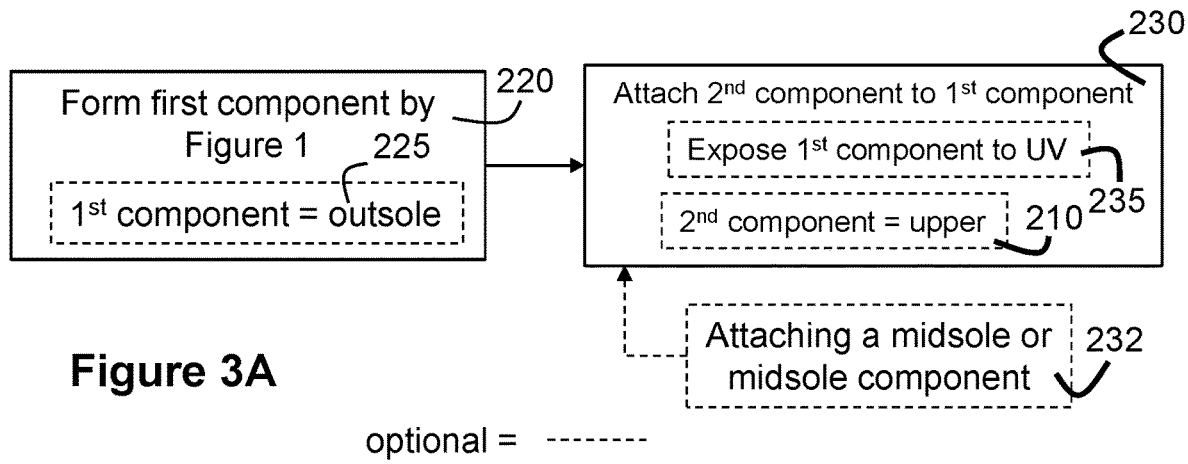
FIG. 3A is a flow chart of a method of forming an article of footwear using the component formed in the process of FIG. 1.

Referring now to FIG. 3A, a method of forming an article of footwear, apparel, or sporting equipment is provided. This method 200 generally comprises attaching 215 a first component formed by the molding process of FIG. 1 as described above and as further defined herein 220; and a second component 230, thereby forming the article. When desirable, the first component formed by the molding process may be an outsole 225 and the second component may be an upper 210 with the resulting footwear being with or without a midsole or midsole component. When the midsole is present, the method may further comprise attaching the midsole or midsole component to the outsole before or concurrently with the attaching of the upper to the outsole 232.

The attachment of the upper to the outsole or the midsole to the outsole 230 may comprise heating the outsole or midsole to a temperature from about 40° C. up to about 170° C. in order to soften the UV radiation curable material and/or exposing the outsole to ultraviolet (UV) radiation 235 in an amount and for a duration that is sufficient to at least partially cure the UV radiation curable material. Alternatively, the amount of and/or duration of UV exposure is sufficient to fully cure the UV radiation curable material. Typically, the UV radiation curable material is cooled below its softening temperature after or prior to being exposed to the ultraviolet (UV) radiation. In other words, the step of contouring and/or adhering the UV radiation curable material may be performed as the temperature of the UV radiation curable material is increased to a temperature at which the material softens, followed by decreasing the temperature of the UV radiation curable material below a softening point, with the decrease in the temperature occurring before or after the UV curing has been accomplished.

Figure 3B:
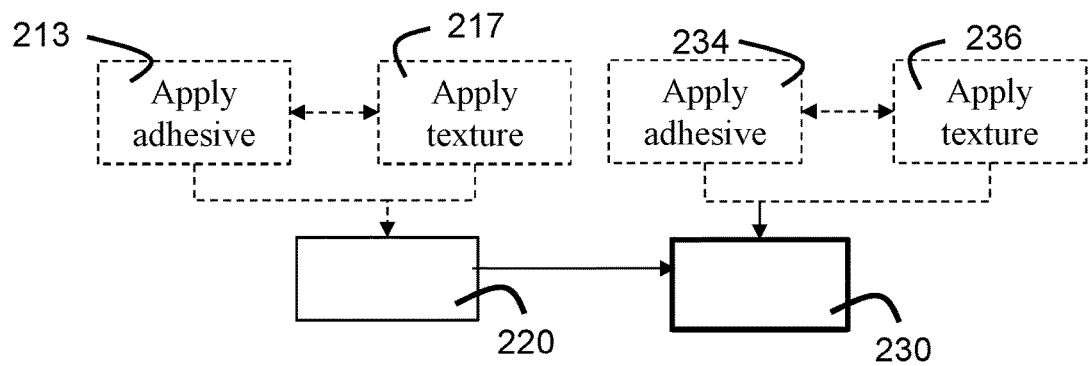
FIG. 3B is a flow chart of optional steps associated with the method of FIG. 3A.

Referring now to FIG. 3B, the strength of the attachment between the various components within the shoe may further be enhanced by applying an adhesive, a primer, or a combination thereof to a surface the midsole or midsole components 234, or to one or more of the outsole, or upper 213. Another means of enhancing the adhesion between the various components within the shoe is to apply a texture to at least one surface of the outsole 217 and/or to the midsole 236, when present, such that the attachment of the outsole to the upper and/or the attachment of the outsole to the midsole exhibits an increase in bond strength as compared to the same attachment made without the surface texture being present. The strength of the attachment of the outsole to the upper and the attachment of the outsole to the midsole, when present, is such that the attachments exhibits a bond strength that is maintained after exposure to a force greater than or equal to 2.5 kgf/cm; alternatively, after exposure to a force of about 3.0 kgf/cm or greater as measured according to the Bonding Strength Testing Protocol.

The adhesive may include, but not be limited to epoxy adhesives, urethane adhesives, acrylic adhesives, cyanoacrylate adhesives, silicone adhesives, modified silane polymers, hot melt adhesives, contact glue (e.g., solvent-borne adhesive comprising natural or synthetic rubber resins with or without halogenation, such as polychloroprene, etc.) or combinations thereof. Alternatively, the adhesive is a thermoplastic polyurethane (TPU), cyanoacrylate, an acrylic, a contact adhesive, a silicone a modified silane polymer, or a mixture thereof.

A primer is a preparatory coating applied to the surface of a material (e.g., $1^{st}$ surface) prior to adhesion to another material (e.g., $2^{nd}$ surface) with or without an adhesive. A primer ensures better adhesion of primed $1^{st}$ surface to the $2^{nd}$ surface, increases the durability of the bond between the $1^{st}$ and $2^{nd}$ surfaces, and provides additional protection for the material ($1^{st}$ surface) to which the primer was applied. The primer may include, without limitation, pre-polymer solutions or dispersions of epoxies, urethanes, acrylics, cyanoacrylates, silicones, and combinations thereof.

The UV radiation curable material incorporated as at least a portion of the component, such as an outsole, for example, may be an UV radiation curable elastomer as previously described above and further defined herein. Alternatively, the UV radiation curable material is an UV radiation curable polyurethane rubber. The UV radiation curable may further comprise a vulcanized rubber, such as a nitrile rubber or the like. The UV radiation curable material comprise a thermoset or a thermoplastic polymer, including but not limited to a polyurethane.

Figure 3C:
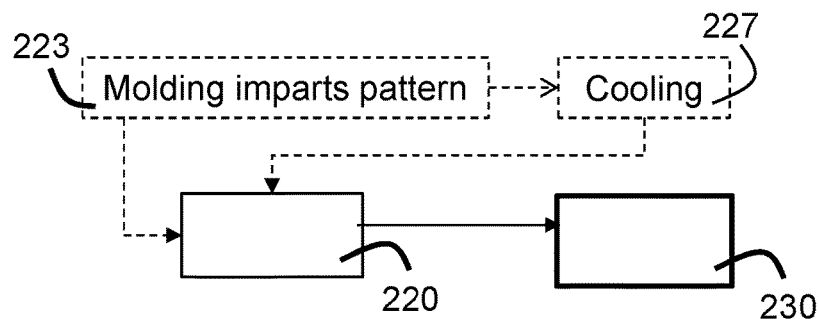
FIG. 3C is a flow chart of other optional steps associated with the method of FIG. 3A.

Referring now to FIG. 3C, the method 200 may further comprise as part of the molding process a mold surface, wherein at least a portion of the molding surface imparts a pattern to at least one surface of the outsole 223. When desirable this pattern may be a tread pattern. The method 200 may also include a cooling step in which the outsole is cooled prior to being removed from the molding surface 227.

Figure 4A:
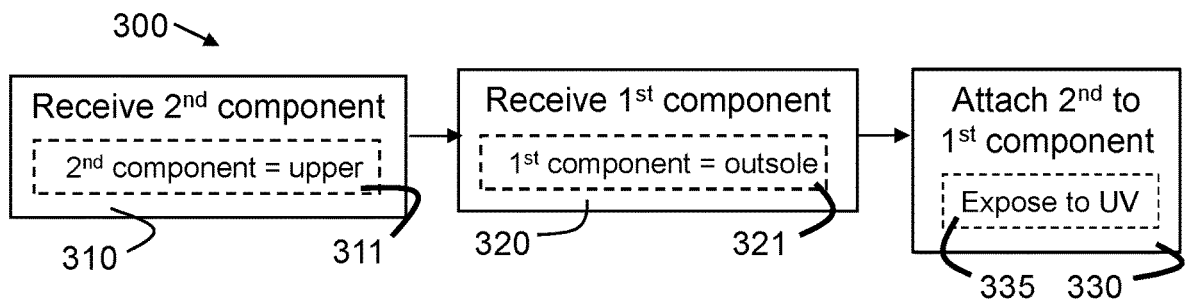
FIG. 4A is a flow chart of another method of forming an article of footwear using the component formed according to the teachings of the present disclosure.

Referring now to FIG. 4A, another method of forming an article of footwear, apparel, or sporting equipment is provided. This method 300 generally comprises receiving a first component comprising an UV radiation curable material 320; receiving a second component 310; and attaching the second component to the first component 330. The method may also further comprise exposing the component to UV radiation 335, such that the UV radiation curable material is at least partially cured; alternatively, fully cured. When the article is an article of footwear, the first component may be an outsole 321 and the second component may be an upper 311.

Figure 4B:
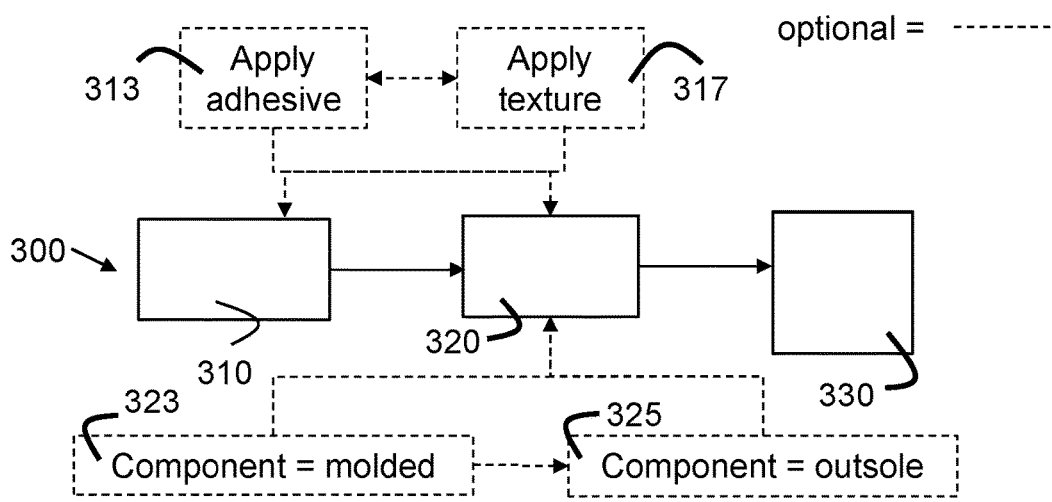
FIG. 4B is a flow chart of optional steps associated with the method of FIG. 4A.

Referring now to FIG. 4B, an adhesive, a primer, or both may optionally be applied 313 to one or more of the upper and the component in order to enhance adhesion there between. In addition, a texture may be applied 317 to the upper, the component, or a combination thereof. This texture may be a tread pattern when and if desired. Optionally, the component may be a molded component 323 and when desirable, this molded component may be an outsole 325.

Figure 5:
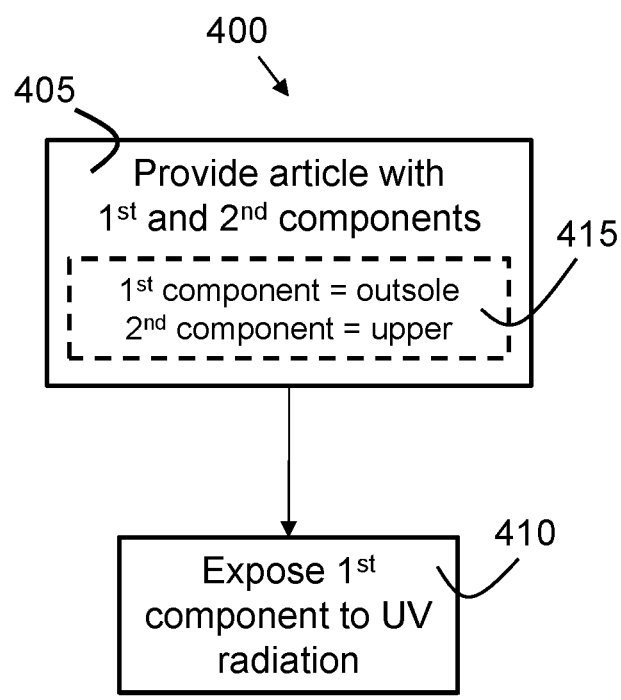
FIG. 5 is a schematic representation of a method of finishing an article according to the teachings of the present disclosure.

Referring now to FIG. 5, a method of finishing an article of footwear, apparel, or sporting equipment is provided. This method 400 generally comprises providing an article having a first component and second component as previously defined herein 405 (best shown in FIGS. 2A-2D) and exposing the first component to ultraviolet (UV) radiation, such that the first component is fully cured 410. When the article is an article of footwear, the first component may be an outsole and the second component may be an upper 415. In this case, the finishing of the article of footwear exposes the outsole to UV radiation, such that the outsole is fully cured 410. Other finishing operations, as previously described above may also be performed upon the shoe without exceeding the scope of the present disclosure.

The following specific examples are given to illustrate the attachment between the molded component and other parts of the article of apparel or sporting equipment, such as garments and footwear, formed according to the teachings of the present disclosure, as well as the bond strength formed there between, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Bond Strength Testing Protocol

A bonding test is performed with the purpose of evaluating the strength of the adhesion bond along an interface of the UV radiation cured material and another material. For example, the adhesion bond can be a bond between an outsole and an upper. In this test a flat component (e.g., a textile) is placed in contact with an UV radiation curable material on a flat surface, and then a compressive force of at least 2 kgf/cm$^2$ is applied to the combination of the component and the UV radiation curable material, leaving an edge region of the component and an opposing edge region of the UV radiation curable material which are not in contact or compressed. Following the compression, the combination of the component and the UV radiation curable material is then exposed UV radiation in an amount and for a duration that is sufficient to fully cure the UV radiation curable material, forming a composite sheet including the edge regions. The composite sheet is then cut into strips to form test specimens, with each test specimen including a length of the edge regions for grasping in a test apparatus capable of measuring applied force, such as an Instron testing system. Each strip has a width of 25.4 cm (1 inch). Intervals are marked along the length of the strips with each interval being spaced apart by 2 cm. Depending upon the length of the strips, between 2 and 5 intervals may be marked on each strip. The edge of textile and the UV radiation curable material of a molded specimen are then grasped at an edge region by the testing apparatus. The tabs are then pulled with an increasing amount of force until the surfaces of the textile and the UV radiation curable material are separated over the length of at least one interval. The amount of force required to separate the surfaces of the textile and the UV radiation curable material is measured by the testing apparatus. In order for a specimen to be considered as passing the bonding test, a minimum force of 2.5 kgf/cm force is required to separate the bonded surfaces of the component and the UV radiation cured material.

Example 1—Bonding Performance

UV radiation curable polyurethane rubber (Millathane® UV, TSE Industries Inc., Clearwater, Fla.) was attached using a compression molding process to a knit textile formed of TPU coated yarn (Runs A & B) manufactured by Sambu Fine Chemicals, Korea and to a knit textile formed of uncoated PET yarn (Runs C & D) manufactured by Unifi, Inc. (Greensboro, N.C., USA). The combinations of the UV radiation curable polyurethane rubber and knit textiles were then exposed to UV light, fully curing the UV radiation curable polyurethane rubber. Each of the four cured samples was prepared and tested twice (Tests 1 & 2) according to the Bond Strength Testing Protocol described above. The measured test results are summarized in Table 1.

TABLE 1

Bonding Test Results

| Run No. | Description | Test 1 (kgf/cm) | Test 2 (kgf/cm) | Pass/Fail (≥2.5 kgf/cm) |
| --- | --- | --- | --- | --- |
| A | UV radiation curable cured polyurethane rubber w/TPU coated yarn | 3.4 | 3.4 | PASS |
| B | UV radiation curable cured polyurethane rubber w/TPU coated yarn | 3.4 | 3.8 | PASS |
| C | UV radiation curable cured polyurethane rubber w/ uncoated PET yarn | Tab broke at 2.9 | Tab broke at 2.9 | PASS |
| D | UV radiation curable cured polyurethane rubber w/ uncoated PET yarn | 3.1 | 3.5 | PASS |

This example demonstrates that the UV radiation curable polyurethane rubber can be attached to a textile with the bond strength necessary to be used as an outsole in an article of footwear. More specifically, Runs A-D maintained their bond after application of a 2.5 kgf/cm force in the Bond Strength Test, and more than a 2.9 kgf/cm force was necessary to break the bonds.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject matter of the disclosure may also relate, among others, to the following aspects:

1. A method of forming a component of an article of apparel or sporting equipment, the method comprising:
    placing an ultraviolet (UV) radiation curable material in contact with a molding surface;
    conforming the UV radiation curable material to a shape of the molding surface, forming a molded component; and
    removing the molded component from the molding surface, such that the component maintains the shape of the molding surface.

2. The method of Aspect 1, wherein the method further comprises increasing a temperature of at least a portion of the UV radiation curable material before the placing, before the conforming, or during the conforming.

3. The method of Aspect 1 or 2, wherein the method further comprises applying compressive force to the molding surface or to the UV radiation curable material during the conforming.

4. The method of Aspect 3, wherein applying the compressive force includes applying increased pressure or applying a vacuum.

5. The method of any of Aspects 1 to 4, wherein the method comprises protecting the UV radiation curable material from ultraviolet (UV) radiation during one or more steps of the method.

6. The method of any of Aspects 1 to 5, wherein during the conforming step, the UV radiation curable material is maintained at a temperature below 170 degrees Celsius.

7. The method of any of Aspects 1 to 6, wherein the molding surface is part of a compression mold.

8. The method of any of Aspects 1 to 6, wherein the molding surface is a single substantially planar molding surface.

9. The method of any of Aspects, 1 to 8, where the molding surface is textured.

10. The method of any of Aspects 1 to 9, wherein the method further comprises forming the UV radiation curable material into a sheet before the conforming.

11. The method of any of Aspects 1 to 10, wherein the method further comprises cutting or trimming the UV radiation curable material before the conforming.

12. The method of any of Aspects 1 to 11, wherein the method further comprises cutting or trimming UV radiation curable material from the molded component.

13. The method of any of Aspects 1 to 12, further comprising exposing the molded component to ultraviolet radiation in an amount and for a duration that is sufficient to partially cure the UV radiation curable material.

14. The method of any of Aspects 1 to 12, further comprising exposing the molded component to ultraviolet radiation in an amount and for a duration that is sufficient to fully cure the UV radiation curable material.

15. The method of any of Aspects 1 to 14, wherein the component of the article of apparel or sporting equipment is a component of a garment.

16. The method of any of Aspects 1 to 14, wherein the component of the article of apparel or sporting equipment is a component of an article of sporting equipment.

17. The method of any of Aspects 1 to 14, wherein the component of the article of apparel or sporting equipment is a component of an article of footwear.

18. The method of Aspect 17, wherein the component of the article of footwear is an outsole.

19. The method of any of Aspects 1 to 18, wherein the UV radiation curable material includes an UV radiation curable elastomer.

20. The method of any of Aspects 1 to 19, wherein the UV radiation curable material includes a rubber.

21. The method of any of Aspects 1 to 20, wherein the UV radiation curable material includes an UV radiation curable polyurethane rubber.

22. The method of any of Aspects 1 to 20, wherein the UV radiation curable material includes an UV radiation curable millable polyurethane gum.

23. The method of any of Aspects 1 to 22 wherein the UV radiation curable material further comprises one or more photoinitiators.

24. The method of Aspect 23, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

25. The method of any of Aspects 1 to 24, wherein the UV radiation curable material further comprises one or more processing aids.

26. The method of Aspect 25, wherein the processing aids are independently selected from the group of plasticizers, mold release agents, lubricants, antioxidants, flame retardants, dyes, pigments, reinforcing and non-reinforcing fillers, fiber reinforcements, and light stabilizers.

27. The method of any of Aspects 1 to 26, wherein at least a portion of the molding surface in the molding process imparts a pattern to at least one surface of the molded component.

28. The method of any of Aspects 1 to 27, wherein the method further comprises a cooling step after the application of the compressive force, and prior to removing the molded component from the mold.

29. A method of forming an article of footwear, apparel or sporting equipment, the method comprising:
    attaching a first component of an article of footwear, apparel or sporting equipment formed according to the molding process of any of Aspects 1 to 18, and a second component, thereby forming the article of footwear, apparel or sporting equipment.

30. The method of Aspect 29, wherein the first component is an outsole.

31. The method of Aspect 30, wherein the second component is an upper for an article of footwear.

32. The method of Aspect 31, wherein the method further comprises attaching a midsole or midsole component and the outsole before or concurrently with attaching the upper and the outsole.

33. The method of Aspect 32, wherein the attaching of the upper and the outsole or the upper and the midsole and the outsole comprises exposing the outsole to ultraviolet radiation in an amount and for a duration sufficient to at least partially cure the UV radiation curable material.

34. The method of Aspect 32, wherein the attaching the upper to the outsole or the midsole to the outsole comprises exposing the outsole to ultraviolet radiation in an amount and for a duration sufficient to fully cure the UV radiation curable material.

35. The method of any of Aspects 30 to 34, wherein at least one surface of the outsole includes a pattern.

36. The method of Aspect 35, wherein the pattern is a tread pattern.

37. The method of any of Aspects 31 to 36, wherein the upper comprises one or more of a textile, leather, or both.

38. The method of Aspect 37, wherein the textile includes a knit textile, a woven textile, a non-woven textile, a braided textile, or any combination thereof.

39. The method of any of Aspects 37 or 38, wherein the textile includes one or more natural or synthetic fibers or yarns.

40. The method of Aspect 39, wherein the synthetic yarns comprise a thermoplastic polyurethane (TPU), a polyamide, a polyester, a polyolefin, or a mixture thereof.

41. The method of any of Aspects 31 to 40, wherein the method further comprises applying an adhesive, a primer, or a combination thereof to a surface of one or more of the outsole or the upper.

42. The method of any of Aspects 31 to 41, wherein at least one surface of the outsole is textured, such that the attachment of the outsole to the upper exhibits an increase in bond strength as compared to the same attachment made without the texture.

43. The method of any of Aspects 32 or 34, wherein the method further comprises applying an adhesive, a primer, or a combination thereof to a surface of the midsole.

44. The method of Aspect 43, wherein the adhesive comprises a thermoplastic polyurethane (TPU), a cyanoacrylate, an acrylic, a contact adhesive, a silicone a modified silane polymer, or a mixture thereof.

45. The method of Aspect 43 wherein the primer comprises a pre-polymer solution or dispersion of an epoxy, urethane, acrylic, cyanoacrylate, silicone, or a combination thereof.

46. The method of Aspect 32, wherein the midsole comprises a foam material formed as sheet stock, by injection molding, by compression molding, or a combination thereof.

47. The method of Aspect 46, wherein the foam material comprises a polyurethane (PU), an ethylene vinyl acetate (EVA), or a mixture of PU or EVA with a rubber.

48. The method of any of Aspects 32 to 34 or 43 to 47, wherein at least one surface of the midsole is textured, such that the attachment of the outsole to the midsole exhibits an increase in bond strength as compared to the same attachment made without the texture.

49. The method of any of Aspects 31 to 48, wherein the attachment of the outsole to the upper exhibits a bond strength that is maintained after exposure at a force of 2.5 kgf/cm or greater as measured according to the Bond Strength Testing Protocol.

50. An article of footwear, apparel, or sporting equipment, the article of footwear, apparel, or sporting equipment being formed according to the method of any of Aspects 29-49.

51. An article of apparel or sporting equipment comprising:
a first molded component of an article of apparel or sporting equipment comprising an ultraviolet (UV) radiation cured material; and
a second component of an article of apparel or sporting equipment, wherein the first and second components are attached to each other and form the article of apparel or sporting equipment.

52. The article of Aspect 52, wherein the first component and the second component are attached to each other at least by a bond formed directly between the UV radiation cured material of the first component and the second component.

53. The article of Aspect 53, wherein an interface between the UV radiation cured material of the first component and the second component is free of adhesive materials.

54. The article of any of Aspects 52 to 54, wherein the article of apparel is an article of footwear.

55. The article of Aspect 55, wherein the first component is an outsole for an article of footwear.

56. The article of any of Aspects 51 to 55, wherein the UV radiation cured material includes an UV radiation curable elastomer.

57. The article any of Aspects 51 to 56, wherein the UV radiation cured material includes a rubber.

58. The article of any of Aspects 51 to 57, wherein the UV radiation cured material includes an UV radiation cured polyurethane rubber.

59. The article of any of Aspects 51 to 58, wherein at least one surface of the first molded component includes a pattern.

60. The article of any of Aspects 51 to 59, wherein the first molded component further comprises one or more processing aids.

61. The article of Aspect 60, wherein the processing aids are independently selected from the group of plasticizers, mold release agents, lubricants, antioxidants, flame retardants, dyes, pigments, reinforcing and non-reinforcing fillers, fiber reinforcements, and light stabilizers.

62. The article of any of Aspect 51 to 61, wherein the second component comprises one or more of a textile, leather, or both.

63. The article of Aspect 62, wherein the textile includes a knit textile, a woven textile, a non-woven textile, a braided textile, or any combination thereof.

64. The article of any of Aspects 62 or 63, wherein the textile includes one or more natural or synthetic fibers or yarns.

65. The article of Aspect 64, wherein the synthetic yarns comprise a thermoplastic polyurethane (TPU), a polyamide, a polyester, a polyolefin, or a mixture thereof.

66. The article of any of Aspects 51 to 65, wherein at least one surface of the first molded component is textured, such that the attachment of the first molded component to the $2^{nd}$ component exhibits an increase in bond strength as compared to the same attachment made without the texture.

67. The article of any of Aspects 51 to 66, wherein the attachment of the first component to the second component exhibits a bond strength that is greater than or equal to 2.5 kgf/cm as measured according to the Bond Strength Testing Protocol.

68. An article of footwear, apparel, or sporting equipment comprising:
a first component having a predetermined shape; the first component comprising an UV radiation curable material in an uncured or partially cured state; and
a second component; the second component being attached to the first component.

69. The article of Aspect 68, wherein the article of apparel is an article of footwear in which the first component is an outsole and the second component is an upper.

70. The article of Aspect 69, wherein the article of footwear further comprises a midsole or a midsole component attached to the outsole.

71. The article of any of Aspects 69 to 70, wherein the UV radiation curable material comprises an UV radiation curable elastomer.

72. The article of any of Aspects 69 to 71, wherein the UV radiation curable material further comprises one or more photoinitiators and/or other processing aids.

73. The article of any of Aspects 69 to 72, wherein at least one surface of the outsole has a tread pattern.

74. The article of any of Aspects 69 to 73, wherein the upper comprises one or more of a textile, leather, or both.

75. The article of Aspect 70, wherein the midsole comprises a foam material formed as sheet stock, by injection molding, or by compression molding.

76. The article of Aspect 75, wherein the foam material comprises a polyurethane (PU), an ethylene vinyl acetate (EVA), a rubber, or a combination thereof.

77. The article of any of Aspects 69-76, wherein the article of footwear further comprises an adhesive, a primer, or a combination thereof located on a surface of one or more of the outsole or the upper.

78. The article of any of Aspects 69-77, wherein at least one surface of the outsole is textured, such that the attachment of the outsole to the upper exhibits an increase in bond strength as compared to the same attachment made without the texture.

79. The article of any of Aspects 70, 75, or 76, wherein the article of footwear further comprises an adhesive, a primer, or a combination thereof located on a surface of the midsole.

80. The article of any of Aspects 70, 75, or 76, wherein at least one surface of the midsole is textured, such that the attachment of the outsole to the midsole exhibits an increase in bond strength as compared to the same attachment made without the texture.

81. The article of any of Aspects 69 to 80, wherein the attachment of the outsole to the midsole exhibits a bond strength that is maintained after exposure up to a force of 2.5 kgf/cm as measured according to the Bond Strength Testing Protocol.

82. A method of forming an article of footwear, apparel, or sporting equipment, the method comprising:
  receiving a first component comprising an ultraviolet (UV) radiation curable material;
  receiving a second component; and
  attaching the second component to the first component.

83. The method of Aspect 82, wherein the first component in the article of footwear is an outsole and the second component is an upper.

84. The method of Aspect 83, wherein the method further comprises attaching a midsole or midsole component and the outsole before or concurrently with attaching the upper and the outsole.

85. The method of Aspect 84, wherein the attaching of the upper and the outsole or the upper and the midsole and the outsole comprises exposing the outsole to ultraviolet (UV) radiation in an amount and for a duration sufficient to at least partially cure the UV radiation curable material.

86. The method of Aspect 84, wherein the attaching the upper to the outsole or the midsole to the outsole comprises exposing the outsole to ultraviolet (UV) radiation in an amount and for a duration sufficient to fully cure the UV radiation curable material.

87. The method of any of Aspects 83 to 86, wherein at least one surface of the outsole includes a pattern.

88. The method of Aspect 87, wherein the pattern is a tread pattern.

89. The method of any of Aspects 83 to 88, wherein the upper comprises one or more of a textile, leather, or both.

90. The method of Aspect 89, wherein the textile includes a knit textile, a woven textile, a non-woven textile, a braided textile, or any combination thereof.

91. The method of any of Aspects 89 or 90, wherein the textile includes one or more natural or synthetic fibers or yarns.

92. The method of Aspect 91, wherein the synthetic yarns comprise a thermoplastic polyurethane (TPU), a polyamide, a polyester, a polyolefin, or a mixture thereof.

93. The method of any of Aspects 83 to 92, wherein the method further comprises applying an adhesive, a primer, or a combination thereof to a surface of one or more of the outsole or the upper.

94. The method of any of Aspects 83 to 93, wherein at least one surface of the outsole is textured, such that the attachment of the outsole to the upper exhibits an increase in bond strength as compared to the same attachment made without the texture.

95. The method of any of Aspects 84 to 86, wherein the method further comprises applying an adhesive, a primer, or a combination thereof to a surface of the midsole.

96. The method of Aspect 95, wherein the adhesive comprises a thermoplastic polyurethane (TPU), a cyanoacrylate, an acrylic, a contact adhesive, a silicone a modified silane polymer, or a mixture thereof.

97. The method of Aspect 95 wherein the primer comprises a pre-polymer solution or dispersion of an epoxy, urethane, acrylic, cyanoacrylate, silicone, or a combination thereof.

98. The method of Aspect 84, wherein the midsole comprises a foam material formed as sheet stock, by injection molding, by compression molding, or a combination thereof.

99. The method of Aspect 98, wherein the foam material comprises a polyurethane (PU), an ethylene vinyl acetate (EVA), or a mixture of PU or EVA with a rubber.

100. The method of any of Aspects 84 to 86, 98 or 99, wherein at least one surface of the midsole is textured, such that the attachment of the outsole to the midsole exhibits an increase in bond strength as compared to the same attachment made without the texture.

101. The method of any of Aspects 83 to 100, wherein the attachment of the outsole to the upper exhibits a bond strength that is maintained after exposure at a force of 2.5 kgf/cm or greater as measured according to the Bond Strength Testing Protocol.

102. A method of finishing an article of footwear, apparel, or sporting equipment; the method comprising:
  providing the article of any of Aspects 68 to 81, which includes a first component and a second component; and
  exposing the first component to ultraviolet (UV) radiation, such that the first component is fully cured.

103. The method of Aspect 102, wherein the article is the article of footwear of any of Aspects 69 to 81 in which the first component is an outsole and the second component is an upper.

104. The method of any of Aspects 102 or 103, wherein the UV irradiation results from an UV light that transmits a wavelength of light that is the same as the excitation wavelength exhibited by a photoinitiator present in the first component.

105. The method of Aspect 104, wherein the wavelength transmitted by the UV light is in the range of about 180 nm to about 400 nm.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An article of apparel, the article comprising:
a first molded component of an article of apparel, the first molded component comprising an ultraviolet (UV) radiation cured material, wherein the UV radiation cured material comprises a millable UV polyurethane gum; and
a second component of an article of apparel, wherein the first molded component and the second component are attached to each other and form the article of apparel,
wherein the first molded component and the second component are attached to each other at least by a bond formed directly between the UV radiation cured material of the first molded component and a material of the second component; and
wherein the bond formed directly between the UV radiation cured material of the first molded component and the material of the second component exhibits a bond strength greater than or equal to 2.5 kqf/cm as measured according to the Bond Strength Testing Protocol.

2. The article of claim 1, wherein the bond between the UV radiation cured material of the first molded component and the second component is free of adhesive materials.

3. The article of claim 1, wherein the article of apparel, is an article of footwear.

4. The article of claim 3, wherein the first molded component is an outsole for an article of footwear.

5. The article of claim 4, wherein at least one surface of the outsole has a tread pattern.

6. The article of claim 4, wherein the article of footwear further comprises a midsole or midsole component attached to the outsole.

7. The article of claim 6, wherein the midsole or midsole component comprises a foam material formed as sheet stock, by injection molding, or by compression molding.

8. The article of claim 7, wherein the foam material comprises a polyurethane (PU), an ethylene vinyl acetate (EVA), a rubber, or a combination thereof.

9. The article of claim 1, wherein the second component comprises one or more of a textile, ora leather, or both.

10. The article of claim 9, wherein the second component comprises the textile.

11. The article of claim 10, wherein the textile includes a knit textile, a woven textile, a non-woven textile, a braided textile, or any combination thereof.

12. The article of claim 11, wherein the textile includes one or more natural or synthetic fibers or yarns.

13. The article of claim 12, wherein the textile includes synthetic yarns and the synthetic yarns comprise a thermoplastic polyurethane (TPU), a polyamide, a polyester, a polyolefin, or a mixture thereof.

14. The article of claim 1, wherein at least one surface of the first molded component includes a pattern.

15. The article of claim 1, wherein the article of apparel, is an article of footwear in which the first molded component is an outsole and the second component is an upper.

16. The article of claim 1, wherein at least one surface of the first molded component is textured, such that the bond strength of the bond between the first molded component and the second component exhibits an increase as compared to the same bond made without the texture.

* * * * *

UNITED STATES PATENT AND TRADEMARK OFFICE
CERTIFICATE OF CORRECTION

PATENT NO. : 10,779,609 B2
APPLICATION NO. : 15/959550
DATED : September 22, 2020
INVENTOR(S) : Chen et al.

Page 1 of 1

It is certified that error appears in the above-identified patent and that said Letters Patent is hereby corrected as shown below:

In the Claims

Claim 1, Column 23, Line 23, "equal to 2.5 kqf/cm" should read --equal to 2.5 kgf/cm--.

Claim 9, Column 24, Line 11, "a textile, ora leather, or both." should read --a textile, or a leather, or both.--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*